United States Patent
Callis et al.

(10) Patent No.: US 11,821,219 B2
(45) Date of Patent: Nov. 21, 2023

(54) FLOORING MATERIAL

(71) Applicant: ALTRO LIMITED, Letchworth Garden City (GB)

(72) Inventors: Martin David Callis, Letchworth Garden City (GB); Richard John Peace, Arrington (GB); Laura Yates, Biggleswade (GB); Oliver Fassauer, Dessau-Rosslau (DE); Bernhard Jung, Dessau-Rosslau (DE); Wilfried Spitz, Dessau-Rosslau (DE)

(73) Assignee: ALTRO LIMITED, Letchworth Garden City (GB)

( * ) Notice: Subject to any disclaimer, the term of this patent is extended or adjusted under 35 U.S.C. 154(b) by 0 days.

(21) Appl. No.: 16/840,691

(22) Filed: Apr. 6, 2020

(65) Prior Publication Data
US 2020/0325691 A1     Oct. 15, 2020

(30) Foreign Application Priority Data

Apr. 11, 2019   (GB) ...................................... 1905121

(51) Int. Cl.
*E04F 15/22*     (2006.01)
*B32B 3/06*      (2006.01)
(Continued)

(52) U.S. Cl.
CPC ................ *E04F 15/22* (2013.01); *B32B 3/06* (2013.01); *B32B 3/30* (2013.01); *B32B 27/065* (2013.01);
(Continued)

(58) Field of Classification Search
CPC ... E04F 15/22; E04F 15/02172; E04F 15/107; E04F 15/185; E04F 2290/02; E04F 2203/08; B32B 2471/00
See application file for complete search history.

(56) References Cited

U.S. PATENT DOCUMENTS 3,887,737 A †   6/1975   Baxter et al.
4,018,025 A     4/1977   Collette
(Continued)

FOREIGN PATENT DOCUMENTS

EP     0583146 A1     2/1994
EP     0752498 A2     1/1997
(Continued)

OTHER PUBLICATIONS

Combined Search and Examination Report for GB1905121.8 dated Oct. 29, 2019.
(Continued)

*Primary Examiner* — Patrick J Maestri
(74) *Attorney, Agent, or Firm* — Louis Woo (57) ABSTRACT

The invention provides a ventilating synthetic floor-covering comprising a ventilating support layer and one or more synthetic layers wherein the ventilating support layer comprises a plurality of studs between which narrow ventilation channels are formed even when the floor-covering is compressed in normal use wherein the narrow ventilation channels have a width which is less than a principal dimension of the studs; a ventilating support layer; a production line for use in the preparation of a ventilating support layer wherein the ventilating support layer comprises a support layer and a plurality of studs wherein the production line comprises an embossing roller for embossing the plurality of studs on the support layer or a printing roller for printing the plurality of studs on the support layer wherein narrow ventilation channels are formed between the plurality of studs and wherein the narrow ventilation channels have a width which is less than a principal dimension of the studs; and a method of preparing a synthetic floor-covering according to the invention which method comprises a step of providing a synthetic floor-covering comprising an upper layer and a support layer; and one of the following steps:

(Continued)

(a) embossing the support layer to form a plurality of studs between which one or more narrow ventilation channels are formed;
(b) embossing the upper layer before embossing the support layer to form a plurality of studs between which one or more narrow ventilation channels are formed;
(c) embossing the support layer to form a plurality of studs between which one or more narrow ventilation channels are formed before embossing the upper layer;
(d) embossing the support layer and the upper layer at the same time wherein the support layer is embossed to form a plurality of studs between which one or more narrow ventilation channels are formed; or
(e) applying one or more studs by printing to form a plurality of studs between which one or more narrow ventilation channels are formed;

wherein the narrow ventilation channels have a width which is less than a principal dimension of the studs.

2 Claims, 6 Drawing Sheets

(51) Int. Cl.
  *B32B 3/30*  (2006.01)
  *B32B 27/06* (2006.01)
  *E04F 15/02* (2006.01)
  *E04F 15/10* (2006.01)

(52) U.S. Cl.
  CPC ...... *E04F 15/02172* (2013.01); *E04F 15/107* (2013.01); *B32B 2307/40* (2013.01); *B32B 2307/724* (2013.01); *B32B 2419/04* (2013.01)

(56) References Cited

U.S. PATENT DOCUMENTS

| 4,199,639 | A | | 4/1980 | Ronc | |
|---|---|---|---|---|---|
| 5,234,738 | A | * | 8/1993 | Wolf | E01C 5/18 404/32 |
| 5,950,378 | A | | 9/1999 | Council et al. | |
| 6,837,014 | B2 | * | 1/2005 | Virtanen | B29C 44/321 52/390 |
| 9,593,493 | B2 | | 3/2017 | Pelaez et al. | |
| 2005/0158517 | A1 | * | 7/2005 | Rives | E04F 15/182 428/158 |
| 2013/0216786 | A1 | | 8/2013 | Ferlay et al. | |
| 2014/0335315 | A1 | * | 11/2014 | Virtanen | B32B 37/06 428/159 |

FOREIGN PATENT DOCUMENTS

| EP | 1038661 A1 † | 9/2000 |
|---|---|---|
| GB | 690863 A | 4/1953 |
| GB | 1017292 A | 4/1963 |
| KR | 10068210 B1 | 2/2007 |
| KR | 1020100057957 A | 6/2010 |
| WO | 0042274 A1 | 7/2000 |
| WO | 03106783 A1 | 12/2003 |
| WO | 2008053077 A1 | 5/2008 |
| WO | 2013/083880 A1 † | 6/2013 |
| WO | 2014174433 A1 | 10/2014 |
| WO | 2017108124 A1 | 6/2017 |

OTHER PUBLICATIONS

Wide Range-Sensitive, Bending-Insensitive Pressure Detection and Application to Wearable Healthcare Device , Seunghwan Kim et al., Conference paper at Transducer 2019—EUROSENSORSXXXIII, Berlin, Germany, Jun. 23-27, 2019.
Examination Report of counterpart Canadian application No. CA3077875 dated Dec. 30, 2022.
Examination Report of counterpart EP application No. EP20169157.3 dated Jan. 4, 2023.

\* cited by examiner
† cited by third party

FLOORING MATERIAL

The present invention relates to a ventilating synthetic floor-covering which can be laid without an adhesive and a method for its production.

Increasingly there is a move towards to the manufacture and use of floor coverings that can be installed without using an adhesive to secure a floor covering to the subfloor. This has the following advantages:

- At the end of life, the floor covering can be removed and recycled easily as it does not have any residues of adhesive or sub-floor which would hamper the recycling process.
- At the end of life, the floor covering can be removed without damaging the sub-floor. This avoids the need to repair the subfloor, reducing the cost and time of installing a replacement floor.
- The floor covering can be installed directly on to a damp sub-floor. This could be caused, for example, by damp rising from beneath the floor, or installation on to freshly installed concrete. This avoids the need for the installation of a separate damp proof membrane, thus reducing time and cost of installation.
- Avoidance of the use of adhesives of floor screeds for repair to damaged substrates makes the installation process cleaner. This is preferable in public buildings such as hospitals as adjacent areas does not need to be closed.
- Adhesives or floor screeds have a drying or setting time before the floor can be used after installation. Avoidance of the use of adhesives or floor screeds for repair to damaged substrates means that the area can be used immediately after installation. This is better for public buildings such as hospitals as the area can be returned to service immediately, reducing disruption.

For flexible floor coverings there are two commonly used solutions:

- Use of an underlay to which the floor covering is bonded. Examples include Altro Everlay A or F Ball Stopgap Isolator.
- Floorcoverings with a texture on the back.

Figure 1:
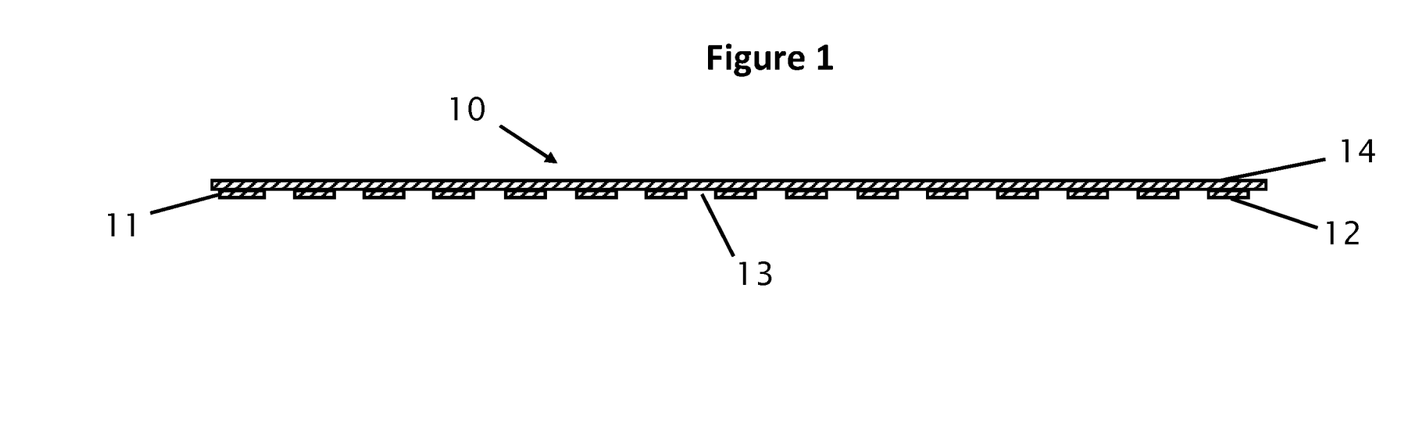
FIG. 1 shows a schematic plan view of a known support layer.

These solutions generally have a lower layer indicated at 10 on FIG. 1 of the accompanying drawings. Lower layer 10 has a floor-facing backing layer 14 on which a layer 11 of button-shaped supports 12 are formed, providing the backing layer 14 with a texture. Between the button-shaped supports, wide pathways 13 beneath the floor are formed for moisture vapour to escape. Typically, these pathways are wide because they have a similar width to the diameter of the button-shaped supports.

Figure 2:
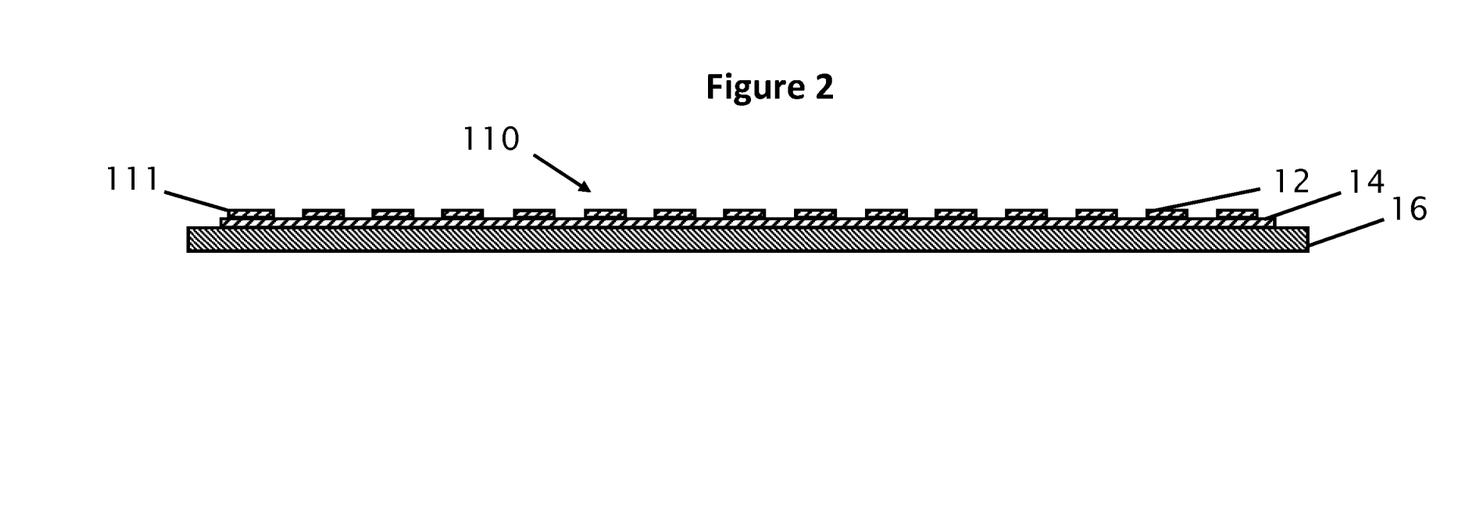
FIG. 2 shows a schematic cross-section of a compressed known support layer.
Figure 3:
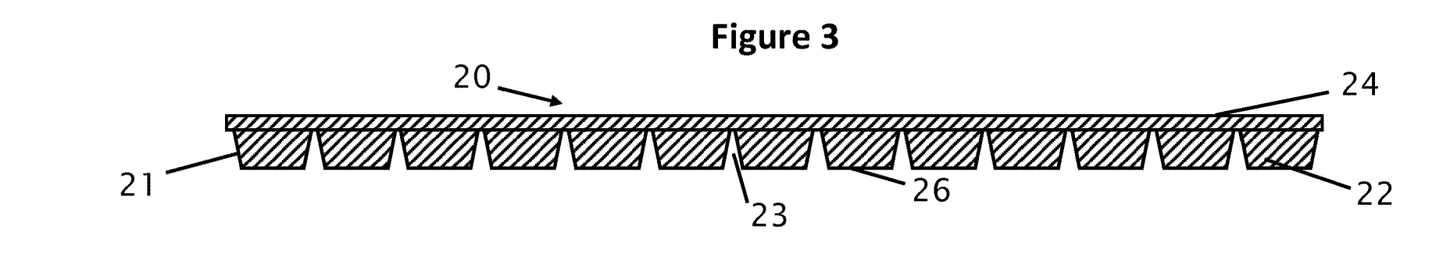
FIG. 3 shows a schematic plan view of a ventilating support layer for use in a floor-covering material according to the invention.

The inventors have identified a problem with the button-shaped supports which is that after prolonged use involving heavy traffic on a floor-covering material including a lower layer 10 on a sub-floor 16, the texture of the backing layer becomes visible, as illustrated in FIG. 2. As a result, the floor-covering no longer has a ventilating effect.

A way of ameliorating these problems has been sought.

According to the invention there is provided a ventilating synthetic floor-covering comprising a ventilating support layer and one or more synthetic layers wherein the ventilating support layer is formed from a plastics material and wherein the ventilating support layer comprises a plurality of studs between which narrow ventilation channels are formed wherein the narrow ventilation channels have a width which is less than a principal dimension of the studs wherein the studs have.

According to the invention there is also provided a ventilating support layer comprising a plurality of studs between which narrow ventilation channels are formed wherein the narrow ventilation channels have a width which is less than a principal dimension of the studs.

According to the invention there is further provided a method of preparing a synthetic floor-covering according to the invention which method comprises a step of providing a synthetic floor-covering comprising an upper layer and a support layer; and one of the following steps:

(a) embossing the support layer to form a plurality of studs between which one or more narrow ventilation channels are formed;
(b) embossing the upper layer before embossing the support layer to form a plurality of studs between which one or more narrow ventilation channels are formed;
(c) embossing the support layer to form a plurality of studs between which one or more narrow ventilation channels are formed before embossing the upper layer;
(d) embossing the support layer and the upper layer at the same time wherein the support layer is embossed to form a plurality of studs between which one or more narrow ventilation channels are formed; or
(e) applying one or more studs by printing to form a plurality of studs between which one or more narrow ventilation channels are formed;

wherein the narrow ventilation channels have a width which is less than a principal dimension of the studs.

According to the invention there is also provided a production line for use in the preparation of a ventilating support layer wherein the ventilating support layer comprises a support layer and a plurality of studs wherein the production line comprises an embossing roller for embossing the plurality of studs on the support layer or a printing roller for printing the plurality of studs on the support layer; wherein narrow ventilation channels are formed between the plurality of studs; and wherein the narrow ventilation channels have a width which is less than a principal dimension of the studs.

Advantages of the invention include:

- the studs provide better support for the floor covering, with reduced area in between the studs as all of the ventilation channels are narrow ventilation channels;
- During the installation process it is common to fix the edges of the sheet to the floor using double sided self-adhesive tape prior to hot welding to join sheets and sealing the edges with mastic. It is also desirable that in certain cases it is possible to bond the product to the floor using an adhesive in the traditional manner. This ventilating support layer presents a larger area for the adhesives to bond to, and therefore improves the bond strength.
- One possible manufacturing method for the ventilating support layer is embossing of a sheet using a textured roller. The ventilating support layer displaces less material than the embossing of a smaller stud, and therefore requires reduced temperature or pressure. In cases where the back of the product is embossed after embossing the surface of the product there is less risk of damage to the top surface.
- The ventilating support layer does not compromise the passage of moisture vapour beneath the flooring.

It should be understood herein that the principal dimension of the studs is a greater horizontal dimension of a stud such as its width or length, measured at its subfloor-engaging bottom. It should further be understood herein that all of the narrow ventilation channels have a width which is less than a principal dimension of the studs. It should also be understood herein that a stud is a peg-like protrusion from a lower or a floor-facing surface of the floor-covering.

In some embodiments, the plurality of studs are resilient studs such that the one or more narrow ventilation channels return to their original shape when a force is removed. An example of a force which may be applied to the floor covering includes a footstep.

In some embodiments, the plurality of studs may form a stud layer. In some embodiments, the stud layer may be arranged on a lower surface of the support layer such that the studs engage a sub-floor surface to which a floor-covering material incorporating the ventilating support layer is applied. In some embodiments, the narrow ventilation channels may form less than 50% of the volume of the stud layer. In some embodiments, the narrow ventilation channels form less than 70% of the volume of the stud layer.

In some embodiments, the plurality of studs may be embossed studs such that the plurality of studs forms an embossed stud layer. In some embodiments, an embossed stud layer is part of the support layer. In some embodiments, the plurality of studs may be printed studs such that the plurality of studs forms a printed stud layer.

In some embodiments, the plurality of studs may be formed from a foamed plastics material. In some embodiments, a suitable foamed plastics material may be mechanically foamed by incorporating one or more types of compressible plastic spheres or may be chemically foamed by being formed with a foaming agent such as an azodicarbonamide. In some embodiments, the support layer may comprise a foamed plastic material. In some embodiments, a foamed plastics material used to form the plurality of studs and/or support layer may have a density from 0.1, e.g. from 0.2, e.g. from 0.3 to 1.5, e.g. to 1.2, e.g. to 1 g/cm$^3$.

In some embodiments, each of the plurality of studs may have substantially the same shape. In some embodiments, a stud may be a tapering stud which has a different principal dimension at its top compared to its principal dimension at its bottom or each stud may be a perpendicular stud which has the same principal dimension at its top and bottom. In some embodiments, a stud may have an inverted truncated pyramidal shape or a right prismatic shape (such as a cuboid shape). In some embodiments, a stud may have a polygonal cross-sectional shape; in some embodiments, a stud may have a cross-sectional shape which has three or four sides. Herein it should be understood that a cross-sectional shape of a stud is its horizontal cross-section when the ventilating support layer is applied to a horizontal surface. In some embodiments, a stud may have a polygonal cross-sectional shape which allows the studs to be arranged such they have narrow ventilation channels between them which have substantially the same width. In some embodiments, a stud may have a square, rectangular, or triangular cross-section.

In some embodiments, the stud may have a principal dimension which is from 1, e.g. from 2, e.g. from 3, to 12, e.g. to 11, e.g. to 10, e.g. to 9, e.g. to 8 mm.

In some embodiments, the plurality of studs may form a surface area which is sufficiently large in relation to the area covered by the narrow ventilation channels such that a floor-covering material may be adhered to a surface (such as a sub-floor). An advantage of this feature is that a floor-covering material comprising a ventilating support layer having this feature can be used as a stick/non-stick floor covering whilst the ventilating support layer still forms narrow ventilating channels. In other words, it can be used to cover a floor surface without or with an adhesive. In some embodiments, the surface area of the plurality of studs may be from 30%, e.g. from 50% to 98%, e.g. to 90% of the area of the support layer.

In some embodiments, the narrow ventilation channel may have an upper channel width which is less than or substantially the same as its lower channel width. In some embodiments, a stud may be a tapering stud and may have an upper channel width which is less than its lower channel width. In some embodiments, a stud may be a perpendicular stud and may have an upper channel width which is substantially the same as its lower channel width. In some embodiments, the upper channel width may be from 0 to 2 mm. In some embodiments, the lower channel width may be from 0.1 to 2 mm.

In some embodiments, a resilient stud may have a height sufficient to prevent collapse of the ventilation channels over time from repeated compression. In some embodiments, a stud may have a height which is sufficient for the plurality of studs to form compressed ventilation channels when the studs are compressed after normal use. In some embodiments, a stud may have a height which is from 0.05 mm, e.g. from 0.1, e.g. from 0.2 mm to 1 mm, e.g. to 0.9 mm, e.g. to 0.8 mm. In some embodiments, a compressed stud still spaces the support layer from a surface to which the floor-covering material has been applied.

In some embodiments, the plurality of studs may have a square and/or rectangular shape. In some embodiments, a ratio of the principal dimension (or length) of the plurality of studs to a lesser dimension (or width) may be from about 3:1, e.g. from about 2:1, for example from about 1.9:1, for example from about 1.8:1, for example from about 1.7:1, for example from about 1.6:1, for example from about 1.5:1, for example from about 1.4:1, for example from about 1.3:1, for example from about 1.2:1, for example from about 1.1:1 to about 1:1. In some embodiments, the narrow ventilation channels may have a width which is less than a lesser dimension (or width) of the studs.

In some embodiments, the support layer may comprise a support. In some embodiments, the support may be a film and/or a non-woven fabric. In some embodiments, the support may be a polymeric film (e.g. a polyester film) and/or may be formed from one or more fibres which include glass-fibre, vinylon fibre, high-density polyethylene fibre, aramid fibre, carbon fibre, cellulose, and/or polyester fibre; for example, a cellulose/polyester support reinforced with a 32 tex glass crennette. In some embodiments, the support may be impregnated with a gelled plastic material. In some embodiments, a gelled plastic material may comprise one or more of the following polymers: PVC, polyvinyl butyral (PVB), polylactic acid (PLA), polyester, a polyolefin, a thermoplastic elastomer and/or polyacrylate.

In some embodiments, step (e) of the method of the invention comprises rotary screen printing or rotogravure printing of the studs. In some embodiments, rotary screen printing comprises printing the plurality of studs using a screen-printing roller having screen-printing apertures. In some embodiments, rotogravure printing comprises printing the plurality of studs using a rotogravure roller having rotogravure cavities. Suitable plastic material for use in rotogravure printing includes a hot melt material such as a thermoset material (e.g. polyurethane) or a thermoplastics material (e.g. EVA). Suitable plastic material for use in rotary screen printing includes PVC plastisol, polyurethane, or silicone.

In some embodiments, the studs of the ventilating support layer have a floor-engaging surface wherein the width of a channel formed by the support layer is less than a principal dimension of the floor-engaging surface.

In some embodiments, the synthetic floor-covering material may be provided in the form of a roll. In some embodiments, the floor-covering material may be formed from one or more synthetic materials such as a plastics material such as a polymeric material. Suitable plastics materials include PVC, polyvinyl butyral (PVB), polylactic acid (PLA), polyester, a polyolefin, a thermoplastic elastomer and/or polyacrylate.

In some embodiments, the floor-covering material may include one or more of the following layers: a foamed layer, a printing layer and a printed design layer, a decorative layer, a clear wear layer, and/or an external protective coating layer. In some embodiments, the floor-covering material may be a floor-covering material which includes a non-slip layer. In some embodiments, the lower layer of the floor-covering material may be a layer of synthetic material which is a layer of plastics material, a foamed layer, a printing layer, or a decorative layer In some embodiments, the printing layer may be suitable for receiving a printed design or having a printed design applied to it by a digital printer. In some embodiments, the printing layer may have a pigment which is suitable for providing a background to a printed design where such a pigment may have a similar or contrasting colour to one or more colours in the printed design. In some embodiments, the printing layer may be formed from a plastics material which may comprise, for example, one or more of the following polymers: PVC, polyvinyl butyral (PVB), polylactic acid (PLA), polyester, a polyolefin, a thermoplastic elastomer and/or polyacrylate.

In some embodiments, the printed design layer may comprise a decoration applied by a printing process, for example offset lithography, flexography, digital printing, gravure, or screen printing. In some embodiments, the printed design layer may be a digitally printed design layer. In some embodiments, the printed design layer may comprise a latex-based ink.

In some embodiments, the decorative layer may be a layer having a decoration such as a pattern. In some embodiments, a decoration or pattern may comprise one or more decorative elements such as a decorative or coloured chip or particle which may be formed from an optionally coloured polymeric or inorganic material.

In some embodiments, the wear layer may comprise a clear plastics material including one or more of the following polymers: PVC, polyvinyl butyral (PVB), polylactic acid (PLA), polyester, a polyolefin, a thermoplastic elastomer and/or polyacrylate.

In some embodiments, the non-slip layer may comprise one or more particles suitable for providing a non-slip surface. In some embodiments, the non-slip layer may be provided as part of the wear layer. In some embodiments, the particles of the non-slip layer may be at least partially embedded in the wear layer. In some embodiments, the floor-covering material may have a protective coating layer on an upper surface of the wear layer.

In some embodiments, the foamed layer may comprise a foamed plastics material capable of imparting a sound attenuation effect, for example an acoustic impact sound reduction of more than 10 dB, for example 11, 12, 13, 14 or 15 dB. In some embodiments, the foamed plastics material may be mechanically foamed by incorporating one or more types of compressible plastic spheres. In some embodiments, the foamed plastics material may be chemically foamed by being formed with a foaming agent such as an azodicarbonamide. In some embodiments, the foamed layer may comprise one or more of the following polymers: PVC, polyvinyl butyral (PVB), polylactic acid (PLA), polyester and/or polyacrylate.

In some embodiments, the protective coating layer may comprise a cured polymer layer which seals the floor-covering material. In some embodiments, the protective coating layer includes a polyurethane, polyacrylate, urethane acrylate or a PVDF based composition.

In some embodiments, the floor-covering material may be embossed to provide a decorative finish and/or to improve the non-slip properties of the floor-covering material. In some embodiments, the non-slip layer comprises one or more particles suitable for providing a non-slip surface. In some embodiments, the particles may be at least partially embedded in the floor-covering material. The particles may comprise one or more types of slip resistant particles such as a glass particle, a silica particle, a polymeric particle (for example Nylon (Trademark)), a ceramic particle (e.g. porcelain) and an aluminium oxide particle. In some embodiments, the particles may be smooth particles. A smooth particle is a particle which has no angular protrusion or indentation, for example a particle which has no protrusion or indentation having an outward facing angle of about 90° or less. In some embodiments, the particles may be one or more of a smooth sphere, bead, and/or grain. The advantage of using a smooth particle in the floor-covering material according to the invention is that the cured coating is easier to clean as the coating lacks any angular surface in which a cleaning material (for example the fibres of a mop) may be caught.

In some embodiments, the step of applying the pre-coated layer to the fabric layer comprises applying a layer of a synthetic composition using a pre-metered coating technique. In some embodiments, the synthetic composition used to apply the pre-coated layer may be a hot melt coating composition. In some embodiments, suitable pre-metered coating techniques include slot die coating, direct coating, curtain coating, or tensioned web coating. As a skilled person would be aware, it is possible to select the thickness of the pre-coated layer by controlling factors such as the viscosity of the synthetic composition and the pressure.

In some embodiments, the step of applying the lower layer may include gelling the lower layer. In some embodiments, the lower layer may be a printing layer and the method of the invention may include a step of applying a printed design layer to the lower layer. In some embodiments, the step of applying a printed design layer may use a roll to roll printing machine. In some embodiments, the printing machine may be a digital printing machine.

In some embodiments, the method may further comprise a step of applying a wear layer to an upper surface of the lower layer or of the printed design layer (for example to an upper surface of the decorative layer) to form an upper layer. In some embodiments, the method may further comprise a step of applying a protective coating layer to an upper surface of the lower layer or of the printed design layer (for example to an upper surface of the wear layer) to form an upper layer. In some embodiments, the method may further comprise a step of applying a non-slip layer to the upper layer (for example to an upper surface of the wear layer or of the protective coating layer).

In some embodiments, the embossing roller in the partial production line according to the invention may be provided by an embossing station. In some embodiments, the embossing station may additionally comprise an opposed roller which may be a pressure roller for applying opposed pressure and/or heat or an upper layer embossing roller such that the embossing station is a dual emboss station where the upper layer and support layer of the floor covering material are embossed at the same time.

In some embodiments, the printing roller may be provided by a printing station. In some embodiments, the printing station may include a source of plastics material. In some embodiments, the printing station may include an opposed roller which may be a pressure roller for applying opposed pressure and/or heat.

In some embodiments, the printing station may be a screen-printing station comprising a screen-printing roller. In some embodiments, the screen-printing roller comprises an internal source of plastic material.

In some embodiments, the printing station may be a rotogravure printing station comprising a rotogravure roller. In some embodiments, the rotogravure printing station comprises an external source of plastic material. In some embodiments, the external source of plastic material has a doctor blade for sealing the external source and/or for cleaning the rotogravure roller.

In some embodiments, the partial production line may additionally include a cooling station and/or an upper layer embossing station. In some embodiments, a cooling station may include a pair of cooling rollers. In some embodiments, an upper layer embossing station may include an upper layer embossing roller and optionally an opposed pressure roller.

The invention will now be described with reference to the following Figures of the accompanying drawings which are not intended to limit the scope of the invention in which.

A ventilating support layer for use in a floor-covering material according to the invention is indicated generally at 20 on FIGS. 3 to 6. Ventilating support layer 20 comprises a stud layer 21 formed by a plurality of studs 22 and a support layer 24. The stud layer 21 provides a texture on a lower surface of the support layer 24 such that the studs 22 engage a sub-floor surface 16 to which a floor-covering material 30,130,230 is applied. The stud layer 21 may be an embossed texture or a printed texture, depending on how it is applied.

The studs 22 which form the stud layer 21 are formed from foamed plastics material. The foamed plastics material may be mechanically foamed by incorporating one or more types of compressible plastic spheres or may be chemically foamed by being formed with a foaming agent such as an azodicarbonamide.

Figure 6:
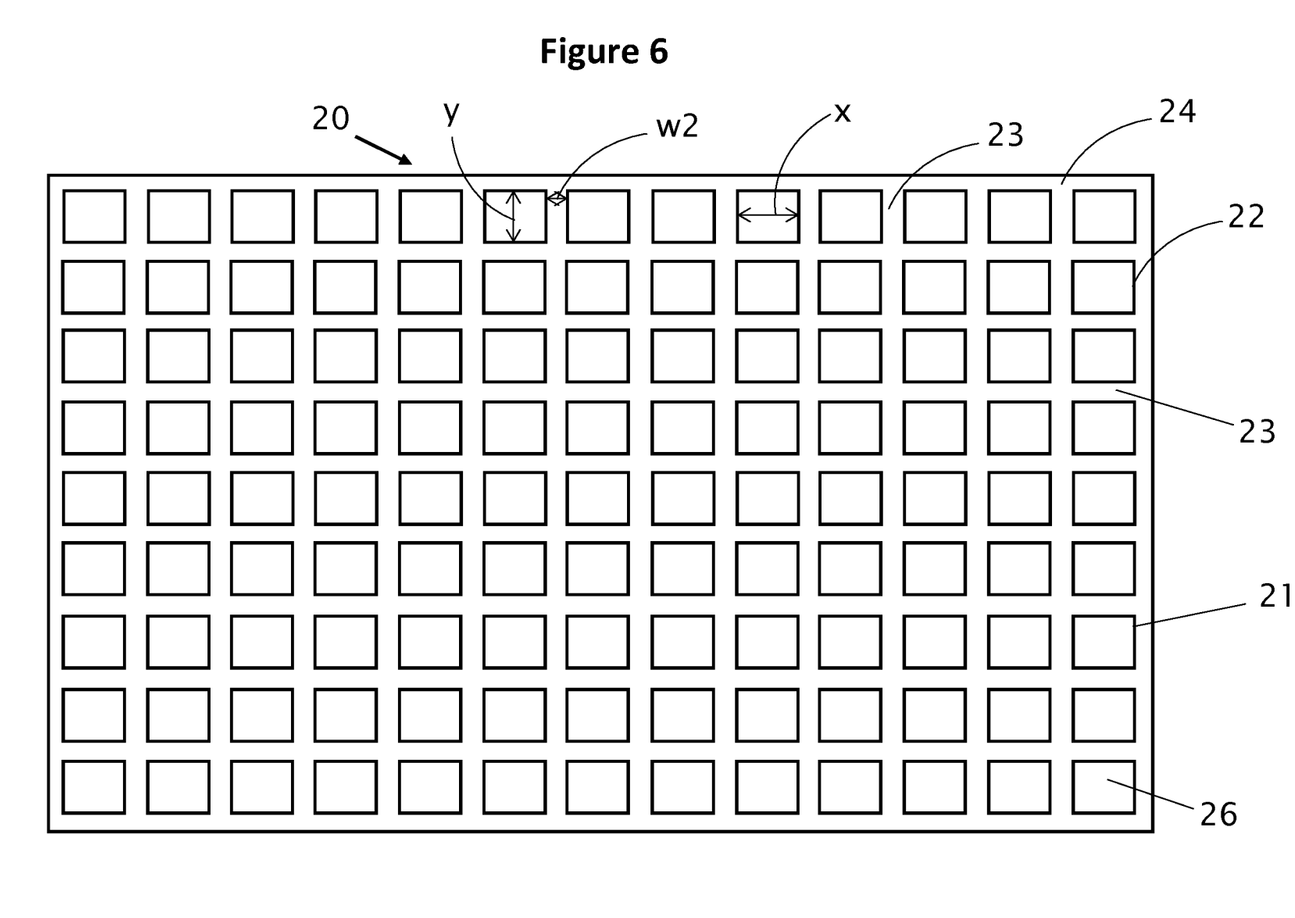
FIG. 6 shows a schematic plan view of a ventilating support layer for use in a floor-covering material according to the invention showing dimensions of the studs and the stud ventilation gaps.
Figure 7:
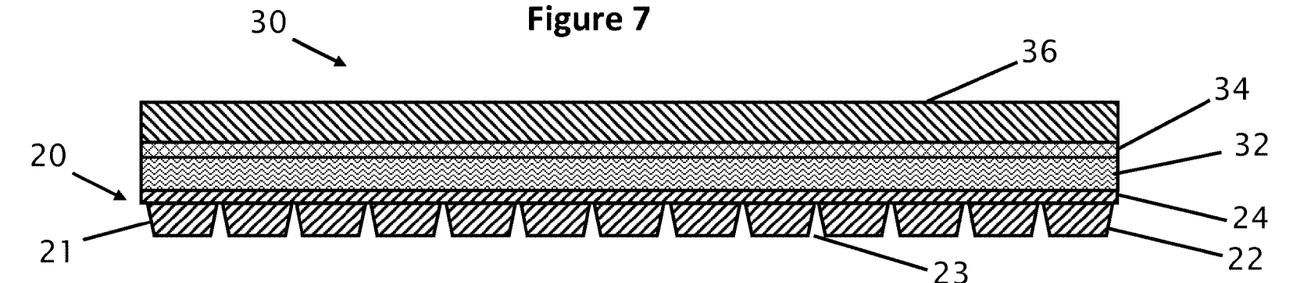
FIG. 7 shows a schematic cross-section of a first embodiment of a floor-covering material according to the invention which incorporates the ventilating support layer shown in FIGS. 3 to 6.
Figure 8:
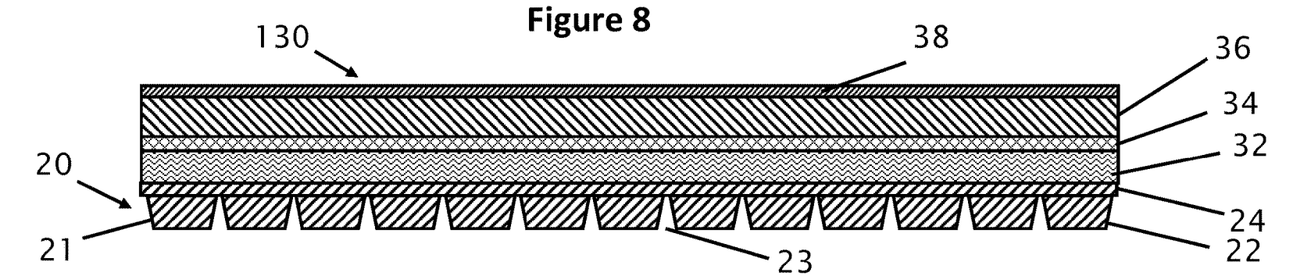
FIG. 8 shows a schematic cross-section of a second embodiment of a floor-covering material according to the invention which incorporates the ventilating support layer shown in FIGS. 3 to 6.
Figure 9:
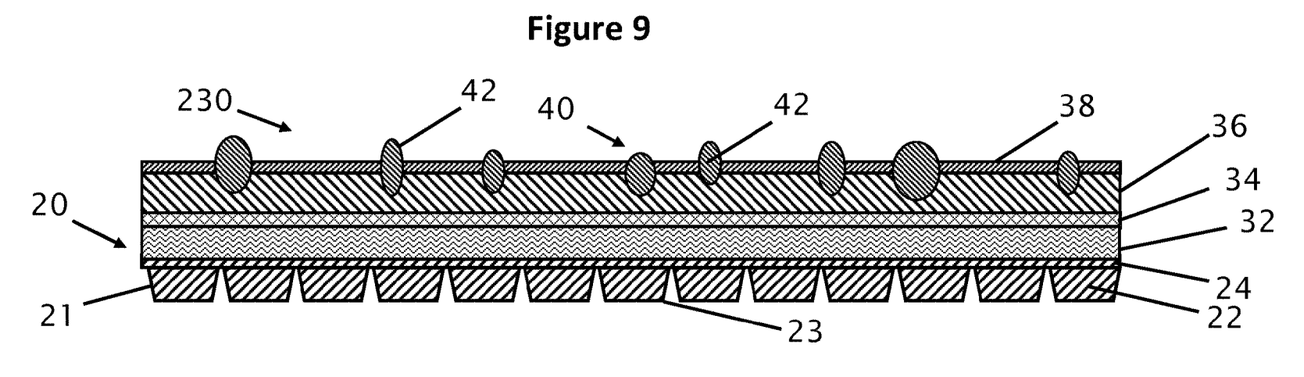
FIG. 9 shows a schematic cross-section of a third embodiment of a floor-covering material according to the invention which incorporates the ventilating support layer shown in FIGS. 3 to 6.

Each stud 22 in stud layer 21 has an inverted truncated rectangular pyramidal shape which extends downwardly from support layer 24 to form a substantially flat floor-engaging surface 26 which has a principal dimension x and a lesser dimension y as indicated on FIG. 6. The ratio of principal dimension x (which is the length of a stud 22) to lesser dimension y (which is the width of a stud 22) may be from about 2:1 to 1:1. Alternatively, where the stud 22 has an inverted truncated square pyramidal shape, the principal dimensions are x and y. The principal dimension x of the stud floor-engaging surface 26 may be from 1 to 10 mm; the lesser dimension y of the stud floor-engaging surface 26 may be the same as the principal dimension x or less than it.

Figure 5:
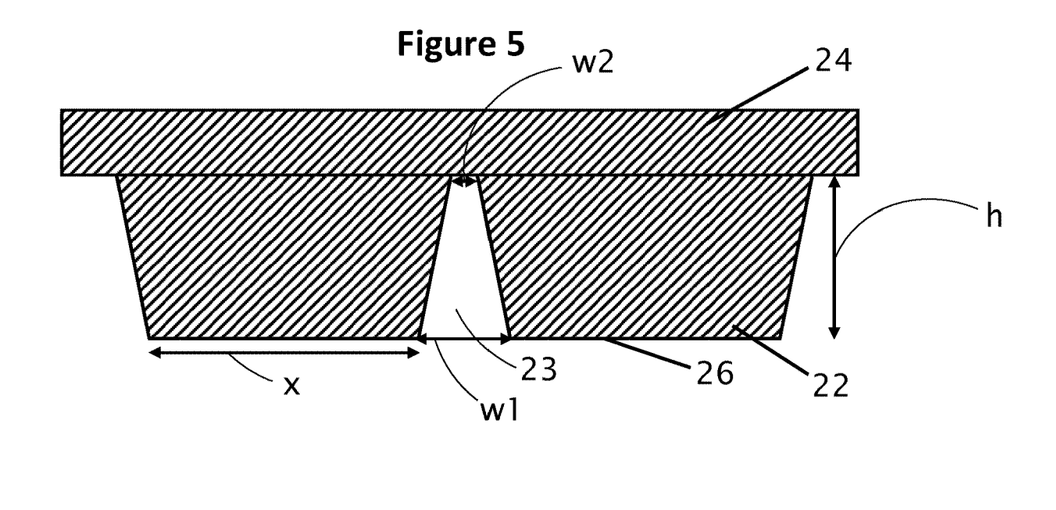
FIG. 5 shows a detailed schematic cross-section of a part of a ventilating support layer for use in a floor-covering material according to the invention showing dimensions of the studs and the stud ventilation gaps.

The studs 22 are separated by a narrow ventilation channel 23 which as shown on FIG. 5. Narrow ventilation channel 23 is defined by an upper channel width w2 which is the closest distance between the tops of adjacent studs 22 (typically measured at an angle of 90° between proximal sides of studs 22) at the level of support layer 24 and a lower channel width w1 which is the closest distance between the bottoms of adjacent studs 22 at the level of the floor-engaging surface 26. As the studs 22 have an inverted truncated rectangular pyramidal shape, upper channel width w2 is less than lower channel width w1 as the studs 22 are tapering studs 22 having a truncated pyramidal shape which taper from the support layer 24 to the floor-engaging surface 26. The upper channel width w2 may be from 0 to 2 mm. The lower channel width w1 may be from 0.1 to 2 mm.

In an alternative embodiment, the studs 22 may have a truncated pyramidal shape having a cross-sectional shape such the studs may be arranged to have narrow ventilation channels 23,25 between them such as a triangular cross-sectional shape.

Figure 4:
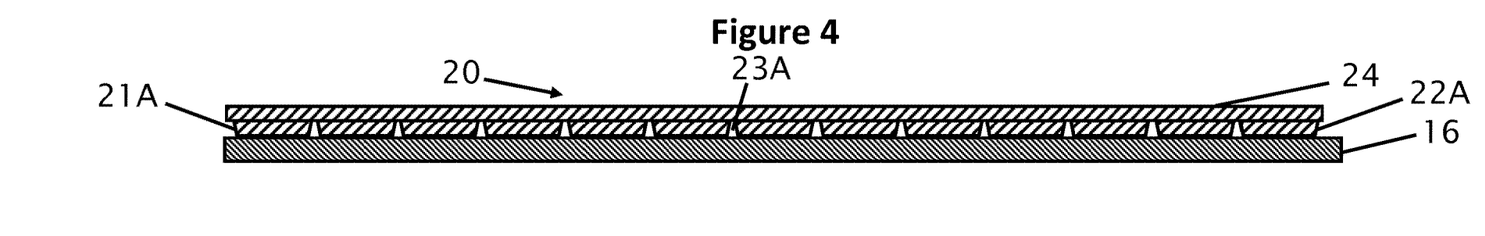
FIG. 4 shows a schematic plan view of a compressed ventilating support layer for use in a floor-covering material according to the invention.

Each stud 22 has a height h indicated on FIG. 5 which is measured from support layer 24 to floor-engaging surface 26. Height h may be from 0.05 mm to 1 mm. As shown in FIG. 4 after heavy use of the floor-covering material 30,130, 230 incorporating a ventilating support layer 20 on a sub-floor 16, the studs are compressed to form compressed studs 22A which have a height which is still sufficient for a compressed narrow ventilating channel 23A to be formed. Compressed stud layer 21A still spaces support layer 24 from the surface to which the floor-covering material 30,130,230 has been applied.

In an alternative embodiment, the studs 22 may be perpendicular studs 22 which have a right prismatic shape and do not taper such that upper channel width w1 is substantially the same as lower channel width w2.

The support layer 24 comprises a support which is a layer of fabric (such as a scrim layer) impregnated with a gelled plastic material. The support may include glass-fibre, vinylon fibre, high-density polyethylene fibre, aramid fibre, carbon fibre, cellulose, and/or polyester fibre; for example, a cellulose/polyester support reinforced with a 32 tex glass crennette. The gelled plastic material may comprise one or more of the following polymers: PVC, polyvinyl butyral (PVB), polylactic acid (PLA), polyester and/or polyacrylate.

The first embodiment of a floor-covering material according to the invention is indicated generally at 30 on FIG. 4. Floor-covering material 30 comprises a ventilating support layer 20 which is formed from a stud layer 21 and a support layer 24. Floor-covering material 30 further comprises a lower layer 32 in the form of a pigmented printing layer on an upper surface of the support layer 24, a printed decorative layer 34 on an upper surface of the pigmented printing layer 32, and a clear wear layer 36 on an upper surface of the decorative layer 34. The support layer 24 may comprise one or more of the following polymers: PVC, polyvinyl butyral (PVB), polylactic acid (PLA), polyester and/or polyacrylate.

The second embodiment of a floor-covering material according to the invention is indicated generally at 130 on FIG. 5. Like features of the second embodiment to the first embodiment of the floor-covering material are identified by like reference numerals. Floor-covering material 130 comprises the layers of a floor-covering material 30 according to the first embodiment which are the ventilating support layer 20, the lower layer 32 in the form of a pigmented printing layer, a printed decorative layer 34, and a wear layer 36. In addition, the floor covering material 130 additionally comprises a protective coating layer 38 applied to an upper surface of the wear layer 36. The protective coating layer 38 comprises a cured polymer layer. Suitable polymers for use in the protective coating layer 38 include polyurethane, polyacrylate, urethane acrylate or a PVDF based composition. A suitable coating composition for forming protective coating layer 38 is a UV curable mixture containing from 20 to 30 parts by weight of oxybis(methyl-2,1-ethanediyl) diacrylate, from 10 to less than 20 parts by weight of 2-phenoxyethyl acrylate, from 10 to less than 20 parts by weight of acrylate resin, from 2.5 to 5 parts by weight of (1-methyl-1,2-ethanediyl)bis[oxy(methyl-2,1-ethanediyl)] diacrylate, from 1 to 5 parts by weight of benzophenone and from 1 to 5 parts by weight of 1-6,hexanedioldiacrylate was prepared.

The third embodiment of a floor-covering material according to the invention is indicated generally at 230 on FIG. 6. Like features of the third embodiment to the first embodiment of the floor-covering material are identified by like reference numerals. Floor-covering material 230 comprises the layers of a floor-covering material 130 according to the second embodiment which are the pre-coated fabric layer 20, the lower layer 32 which is a pigmented printing layer, a printed decorative layer 34, a wear layer 36, and a protective coating layer 38. In addition, the floor-covering material 230 comprises a non-slip layer 40 applied to an upper surface of the protective coating layer 38. Non-slip layer 40 comprises one or more particles 42 suitable for providing a non-slip surface wherein such particles 42 are at least partially embedded in the wear layer 36. The particles 38 may comprise one or more types of slip resistant particles such as aluminium oxide, silicon carbide, quartz and/or glass. The floor-covering material 230 is suitable for use as a covering material for a floor as the non-slip surface is intended to reduce the risk of a person slipping when walking on the floor-covering material.

In an alternative embodiment, the non-slip layer 40 may be applied to the wear layer 36 before the protective coating layer 38 is applied such that the particles 42 are at least partially embedded in the wear layer 36. In an alternative embodiment, the lower layer 32 may be replaced by a decorative layer without applying a printed decorative layer 34 where a printed design is not needed. In an alternative embodiment, the lower layer 32 may be replaced by a plastic layer or foamed plastic layer and a decorative layer or a pigmented printing layer and a printed decorative layer 34 may be applied on top of the lower layer 32.

The floor-covering material 30,130,230 may optionally be embossed. The floor-covering material 30,130,230 may optionally be cut up into tiles.

Figure 10:
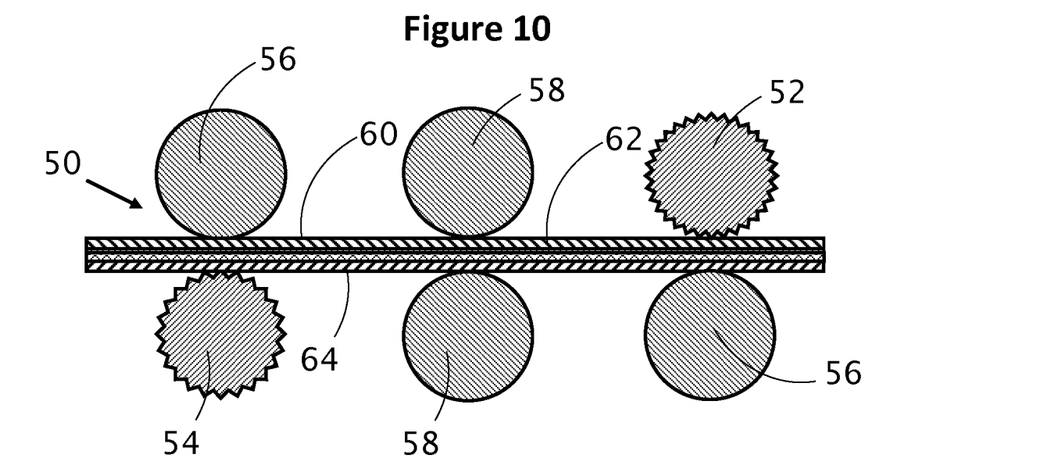
FIG. 10 shows a schematic cross-section of a first embodiment of a production step for use in the method of preparing a synthetic floor-covering according to the invention wherein the embossing step forms the ventilating support layer shown in FIGS. 3 to 6.

A first embodiment of a partial production line for use in the method of the invention to form an embossed texture is indicated generally at 50 on FIG. 10. Embossing production line 50 comprises three pairs of opposed rollers which process a floor covering web 60 which is propelled to run between each pair of rollers. Floor covering web 60 has a floor covering upper layer 62 and a floor covering support layer 24. The first pair of rollers form a stud embossing station and are a lower roller which is a stud embossing roller 54 and an upper pressure roller 56. The second pair of rollers form a cooling station and are an upper cooling roller 58 and lower cooling roller 58. The third pair of rollers form an upper layer embossing station and are an upper roller which is upper layer embossing roller 52 and a lower roller which is pressure roller 56.

In operation, embossing production line 50 embosses a texture of the plurality of studs 22 (which form the stud layer 21) on floor covering support layer 24 by the application of heat and pressure by upper pressure roller 56 against the floor covering web 60 onto the stud embossing roller 54. The floor covering web 60 is then cooled by the cooling rollers 58 before an emboss texture is applied to the floor covering upper layer 62 by upper layer embossing roller 52 and pressure roller 56.

Figure 11:
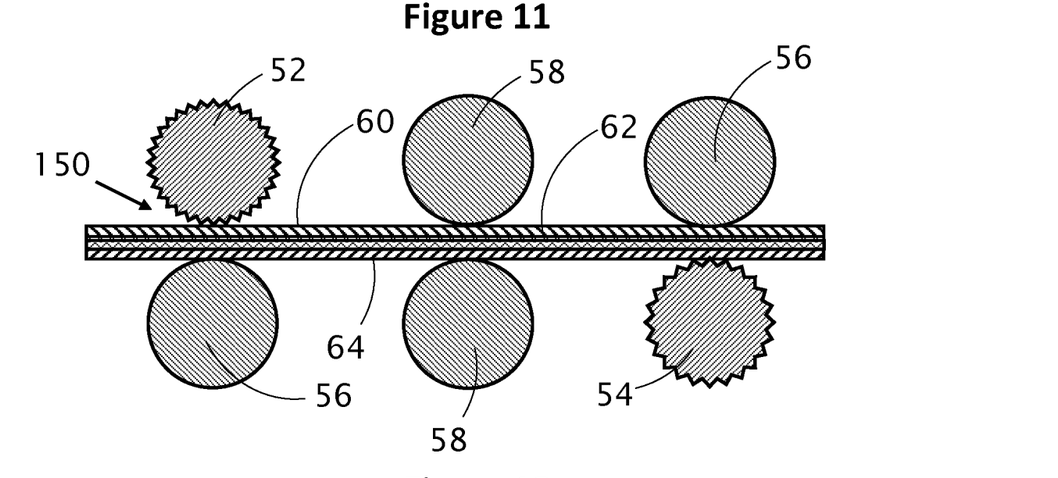
FIG. 11 shows a schematic cross-section of a second embodiment of a production line for use in a second embodiment of an embossing step for use in the method of preparing a synthetic floor-covering according to the invention wherein the embossing step forms the ventilating support layer shown in FIGS. 3 to 6.

A second embodiment of a partial production line for use in the method of the invention to form an embossed texture is indicated generally at 150 on FIG. 11. Like features to the first embodiment of the partial production line are identified by like reference numerals. Embossing production line 150 comprises three pairs of opposed rollers which process a floor covering web 60 which is propelled to run between each pair of rollers. Floor covering web 60 has a floor covering upper layer 62 and a floor covering support layer 24. The first pair of rollers form an upper layer embossing station and is an upper roller which is upper layer embossing roller 52 and a lower roller which is pressure roller 56. The second pair of rollers form a cooling station and is an upper cooling roller 58 and lower cooling roller 58. The third pair of rollers form a stud embossing station and are a lower roller which is a stud embossing roller 54 and an upper pressure roller 56.

In operation, embossing production line 150 first applies an emboss texture to the floor covering upper layer 62 using heat and pressure by upper layer embossing roller 52 and pressure roller 56. The floor covering web 60 is then cooled by the cooling rollers 58. A texture of the plurality of studs 22 (which form the stud layer 21) is then embossed on floor covering support layer 24 by the application of heat and pressure by upper pressure roller 56 against the floor covering web 60 onto the stud embossing roller 54.

Figure 12:
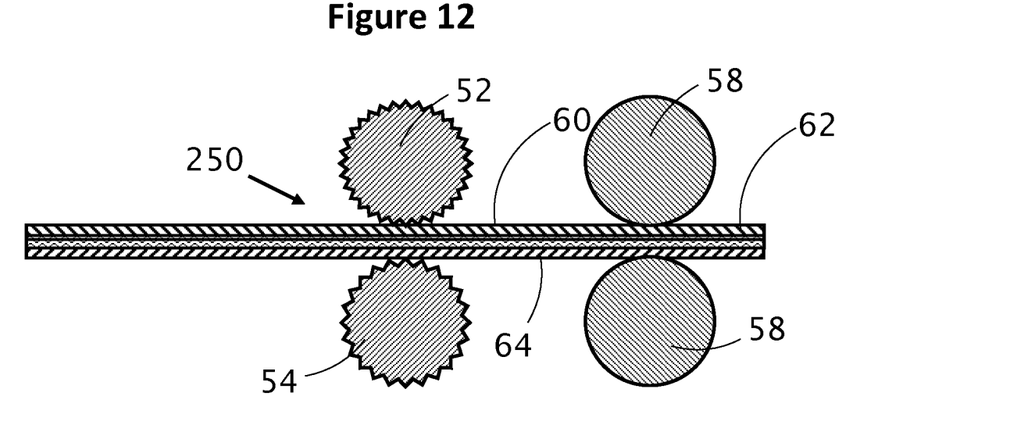
FIG. 12 shows a schematic cross-section of a third embodiment of a production line for use in a third embodiment of an embossing step for use in the method of preparing a synthetic floor-covering according to the invention wherein the embossing step forms the ventilating support layer shown in FIGS. 3 to 6.

A third embodiment of a partial production line for use in the method of the invention to form an embossed texture is indicated generally at 250 on FIG. 12. Like features to the first and second embodiments of the partial production line are identified by like reference numerals. Embossing production line 250 comprises two pairs of opposed rollers which process a floor covering web 60 which is propelled to run between each pair of rollers. Floor covering web 60 has a floor covering upper layer 62 and a floor covering support layer 24. The first pair of rollers form a dual emboss station and is an upper roller which is upper layer embossing roller 52 and a lower roller which is a stud embossing roller 54. The second pair of rollers form a cooling station and is an upper cooling roller 58 and lower cooling roller 58.

In operation, embossing production line 150 applies emboss textures to the floor covering upper layer 62 and to the floor covering support layer 24 to form a texture of the plurality of studs 22 (which form the stud layer 21) using heat and pressure by upper layer embossing roller 52 and pressure roller 56. The floor covering web 60 is then cooled by the cooling rollers 58.

In an alternative embodiment, the cooling rollers 58 may be omitted.

Figure 13:
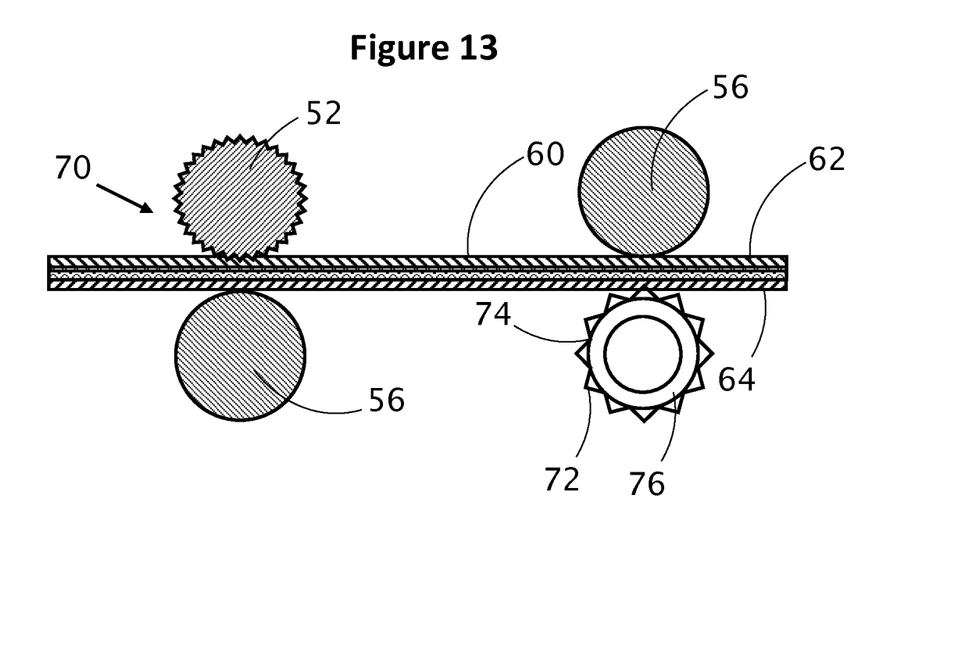
FIG. 13 shows a schematic cross-section of a first embodiment of a printing production line for use in a first embodiment of a step of applying the plurality of studs by printing for use in the method of preparing a synthetic floor-covering according to the invention wherein the printing step forms the ventilating support layer shown in FIGS. 3 to 6.

A first embodiment of a partial production line for use in the method of the invention to apply a printed texture is indicated generally at 70 on FIG. 13. Printing production line 70 comprises two pairs of opposed rollers which process a floor covering web 60 which is propelled to run between each pair of rollers. Floor covering web 60 has a floor covering upper layer 62 and a floor covering support layer 24. The first pair of rollers forms an upper layer embossing station which comprises an upper roller which is upper layer embossing roller 52 and a lower roller which is pressure roller 56. The second pair of rollers forms a screen-printing station which comprises an upper roller which is pressure roller 56 and a lower roller which is a screen-printing roller 72.

Screen-printing roller 72 forms screen-printing apertures 74 which are arranged to be of a suitable size, shape, and orientation to apply a printed texture of the plurality of studs 22. Screen-printing roller 72 has a roller annulus 76 arranged within roller 72. Roller annulus 76 forms an internal source of plastic material for the screen-printing apertures 74. Suitable plastic material for use in rotary screen printing includes PVC plastisol, polyurethane, or silicone.

In operation, printing production line 70 applies an emboss texture to the floor covering upper layer 62 by upper layer embossing roller 52 and pressure roller 56. The floor covering web 60 is then optionally cooled by the cooling rollers (not shown). A screen-printing step is then performed by applying a printed texture of the plurality of studs 22 (which form the stud layer 21) on floor covering support layer 24 by screen-printing plastic material from apertures 74. In an alternative embodiment, the emboss texture may be applied to the floor covering upper layer 62 after the screen-printing step (for example, subsequently in the method of manufacture).

Figure 14:
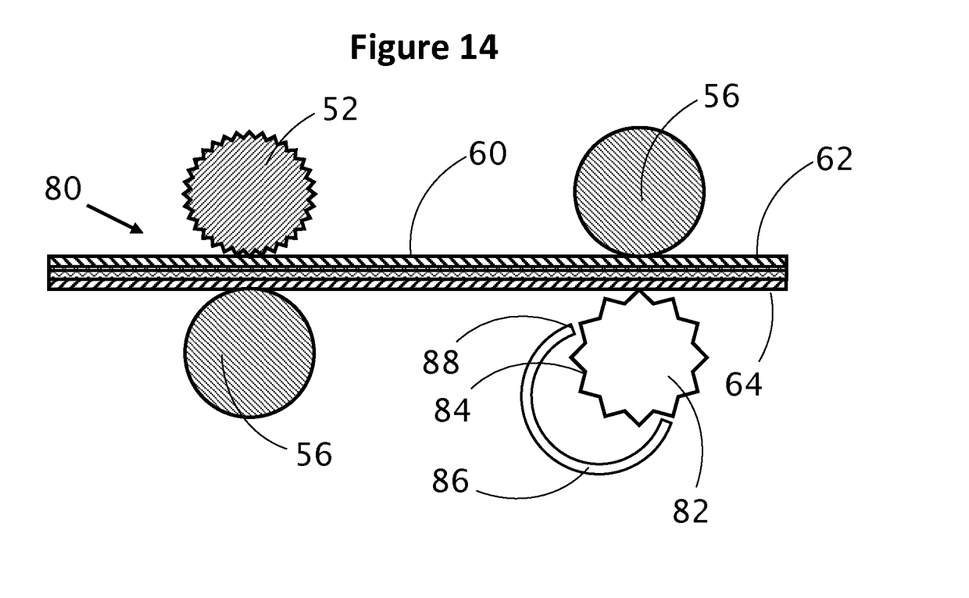
FIG. 14 shows a schematic cross-section of a second embodiment of a printing production line for use in a second embodiment of a step of applying the plurality of studs by printing for use in the method of preparing a synthetic floor-covering according to the invention wherein the printing step forms the ventilating support layer shown in FIGS. 3 to 6.

A second embodiment of a partial production line for use in the method of the invention to apply a printed texture is indicated generally at 170 on FIG. 14. Like features to the first embodiment of the printing production line 70 are identified by like reference numerals. Printing production line 170 comprises a plastic material trough 86 and two pairs of opposed rollers which process a floor covering web 60 which is propelled to run between each pair of rollers. Floor covering web 60 has a floor covering upper layer 62 and a floor covering support layer 24. The first pair of rollers form an upper layer embossing station which comprises an upper roller which is upper layer embossing roller 52 and a lower roller which is pressure roller 56. The second pair of rollers form a rotogravure printing station which comprises an upper roller which is pressure roller 56 and a lower roller which is a rotogravure roller 82.

Trough 86 provides plastic material for forming the studs 22. Trough 86 includes a doctor blade 88. Rotogravure roller 82 forms rotogravure cavities 84 for receiving plastic material from trough 86. Rotogravure cavities 84 are arranged to be of a suitable size, shape, and orientation to apply a printed texture of the plurality of studs 22. Rotogravure roller 82 is arranged in relation to the trough 86 such that on rotation of roller 82, plastic material from the trough 86 fills the rotogravure cavities 84. The doctor blade 88 is arranged to seal the trough 86 and to clean the surface of the rotogravure roller 82 of any excess plastics material.

In operation, printing production line 70 applies an emboss texture to the floor covering upper layer 62 by upper layer embossing roller 52 and pressure roller 56. The floor covering web 60 is then optionally cooled by the cooling rollers (not shown). A printed texture of the plurality of studs 22 (which form the stud layer 21) is then applied on floor covering support layer 24 by printing plastic material from rotogravure cavities 84. In an alternative embodiment, the emboss texture may be applied to the floor covering upper layer 62 after the rotogravure printing step (for example, subsequently in the method of manufacture).

The invention claimed is:

1. A method of preparing a synthetic floor-covering comprises a step of providing a synthetic floor-covering having a ventilating support layer and one or more upper layers wherein the ventilating support layer is formed from a plastics material and wherein the ventilating support layer comprises a plurality of studs between which narrow ventilation channels are formed even when the floor-covering is compressed in normal use wherein the narrow ventilation channels have a width which is less than a principal dimension of the studs, the method further comprising one of the following steps:
   (a) embossing the support layer to form a plurality of studs between which one or more narrow ventilation channels are formed;

(b) embossing the upper layer before embossing the support layer to form a plurality of studs between which one or more narrow ventilation channels are formed;
(c) embossing the support layer to form a plurality of studs between which one or more narrow ventilation channels are formed before embossing the upper layer;
(d) embossing the support layer and the upper layer at the same time wherein the support layer is embossed to form a plurality of studs between which one or more narrow ventilation channels are formed; or
(e) applying one or more studs by printing to form a plurality of studs between which one or more narrow ventilation channels are formed;

wherein the narrow ventilation channels have a width which is less than a principal dimension of the studs.

2. A method as defined in claim 1 wherein the support layer is foamed.

\* \* \* \* \*